United States Patent
Lin et al.

(10) Patent No.: US 9,215,092 B2
(45) Date of Patent: Dec. 15, 2015

(54) CLOCK SELECTION FOR SYNCHRONOUS ETHERNET

(75) Inventors: Xiaotong Lin, Saratoga, CA (US); Mehmet Tazebay, Irvine, CA (US); Peiqing Wang, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 303 days.

(21) Appl. No.: 13/158,277

(22) Filed: Jun. 10, 2011

(65) Prior Publication Data

US 2011/0305248 A1 Dec. 15, 2011

Related U.S. Application Data

(60) Provisional application No. 61/353,261, filed on Jun. 10, 2010, provisional application No. 61/388,106, filed on Sep. 30, 2010.

(51) Int. Cl.
*H04L 12/46* (2006.01)
*H04J 3/06* (2006.01)

(52) U.S. Cl.
CPC .......... *H04L 12/4625* (2013.01); *H04J 3/0641* (2013.01); *H04J 3/0688* (2013.01); *H04J 3/0644* (2013.01)

(58) Field of Classification Search
None
See application file for complete search history.

(56) References Cited

U.S. PATENT DOCUMENTS

| | | | |
|---|---|---|---|
| 5,294,921 A | 3/1994 | Hotka | |
| 6,028,853 A | 2/2000 | Haartsen | |
| 6,665,316 B1 * | 12/2003 | Eidson | 370/509 |
| 6,873,630 B1 * | 3/2005 | Muller et al. | 370/356 |
| 2003/0002519 A1 * | 1/2003 | Terry | H04L 12/40032 370/445 |
| 2003/0117899 A1 * | 6/2003 | Eidson | 368/46 |
| 2004/0028086 A1 * | 2/2004 | Ghiasi et al. | 370/536 |
| 2004/0203936 A1 * | 10/2004 | Ogino | H04M 1/72513 455/463 |
| 2004/0258085 A1 * | 12/2004 | Costo | H04L 12/413 370/445 |
| 2006/0291479 A1 * | 12/2006 | Sasson | H04L 69/28 370/395.62 |
| 2008/0159270 A1 * | 7/2008 | Burke et al. | 370/352 |
| 2009/0092154 A1 * | 4/2009 | Malik et al. | 370/480 |
| 2010/0080248 A1 * | 4/2010 | Aweya et al. | 370/503 |
| 2011/0038283 A1 | 2/2011 | Yu | |
| 2011/0170645 A1 * | 7/2011 | Barnette et al. | 375/376 |
| 2011/0261917 A1 * | 10/2011 | Bedrosian | 375/371 |
| 2012/0026041 A1 * | 2/2012 | Murdock | G01S 5/0289 342/387 |

OTHER PUBLICATIONS

Non-Final Office Action for Application No. 0250536 dated Apr. 3, 2013.

* cited by examiner

*Primary Examiner* — Ayaz Sheikh
*Assistant Examiner* — Mariela Vidal Carpio
(74) *Attorney, Agent, or Firm* — Oblon, McClelland, Maier & Neustadt, L.L.P.

(57) ABSTRACT

An Ethernet PHY may receive an indication from a local timing source that a local clock is suitable for propagation to a link partner. In response, a timer in the Ethernet PHY may be started. In instances that the Ethernet PHY receives, during a time period subsequent to starting the timer and before the timer reaches a predetermined value, an indication that the link partner is propagating a clock that is suitable for the Ethernet PHY to synchronize to, the Ethernet PHY may be configured as timing slave. In instances that the Ethernet PHY does not receive, during the time period subsequent to starting the timer and before the timer reaches a predetermined value, an indication that the link partner is propagating a clock that is suitable for the Ethernet PHY to synchronize to, Ethernet PHY may be configured as timing master upon the timer reaching the predetermined value.

18 Claims, 12 Drawing Sheets

CLOCK SELECTION FOR SYNCHRONOUS ETHERNET

PRIORITY CLAIM

This patent application makes reference to, claims priority to and claims benefit from:
U.S. Provisional Patent Application Ser. No. 61/388,106 filed on Sep. 30, 2010; and
U.S. Provisional Patent Application Ser. No. 61/353,261 filed on Jun. 10, 2010.

Each of the above-stated applications is hereby incorporated herein by reference in its entirety.

INCORPORATION BY REFERENCE

This application also makes reference to:
U.S. patent application Ser. No. 13/072,619 filed on Mar. 25, 2011

The above-stated application is hereby incorporated herein in its entirety.

FIELD OF THE INVENTION

Certain embodiments of the invention relate to communication networks. More specifically, certain embodiments of the invention relate to a method and system for clock selection in synchronous Ethernet devices.

BACKGROUND OF THE INVENTION

Traditional Ethernet networks typically transmit asynchronous data traffic in which there is no requirement to pass a synchronization signal between devices that are coupled via a data link. In traditional telecommunication networks, there are generally rigorous requirements for synchronization of timing between network devices. In telecommunication networks, network devices are typically synchronized to a common clock. T-carrier systems, such as T-1, E-carrier systems, such as E-1, and optical systems, such as the Synchronous Optical Network (SONET) and the Synchronous Digital Hierarchy (SDH), require timing synchronization between network devices.

Synchronous Ethernet (or sync-E) is a means for achieving synchronous operation among network devices in an Ethernet network. Sync-E utilizes the physical layer interface to communicate clock synchronization between network devices that are coupled via a data link.

In telecommunication networks, timing synchronization is typically based on a multi-level clock hierarchy model. Clock sources that are higher in the clock hierarchy model have more rigorous requirements for high accuracy than clock sources that are lower in the clock hierarchy model. For example, in SONET/SDH networks, at the top of the clock hierarchy model is the primary reference clock (PRC). A given telecommunication network operator will typically maintain a single PRC that is utilized as the common clock for the network.

At the second level of the clock hierarchy model is the building integrated timing supply (BITS). BITS is a method for distributing a clock among network devices. The clock is typically distributed to a given network device via an interface located at that network device. For example, in a T-1 network, BITS may distribute the clock to a network device via a T-1 input interface to the network device, or in a SONET network, BITS may distribute the clock to a network device via an (optical carrier) OC-3 input interface to the network device. When the network device is coupled to a subsequent network device, the network device may communicate the clock via an interface link to the subsequent network device, where the subsequent network device utilizes the clock received via the interface link to enable the two devices to establish synchronized timing. This process of distributing synchronized timing between network devices that are coupled via a common interface link (or loop) is referred to as loop timing. In this case, the network device may recover the clock from the input interface (as distributed by BITS) and communicate the recovered clock via an output interface to the subsequent network device, where the subsequent network device receives the clock output from the network device via an input interface located at the subsequent network device.

The third level of the clock hierarchy model is the synchronous equipment timing source (SETS). SETS is a method for distributing a clock within a network device. A SETS is typically integrated within the network device for which the SETS distributes the clock. A SETS may select a clock source from a plurality of candidate clock sources. In a synchronous network, the SETS will typically select a clock source that is received from the highest available clock source in the clock hierarchy model. Preferably, this clock source is the PRC and may be received at the network device via an input interface. In such case, the SETS will select the appropriate input interface and distribute the clock received via that input interface within the network device. In other cases, the SETS may select a clock source that is internally generated within the network device, typically from a phase locked loop (PLL) that is driven by a crystal oscillator (CXO). This internally generated clock source may also be referred to as a local node clock (LNC). The selected clock source is then distributed by the SETS within the network device.

At various times, the SETS may change, or switch, clock sources.

When clock sources are switched, discontinuities may occur in the frequency and/or phase of clock signals. The corresponding discontinuity may cause a temporary link failure.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for phase and frequency re-lock in synchronous Ethernet devices, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
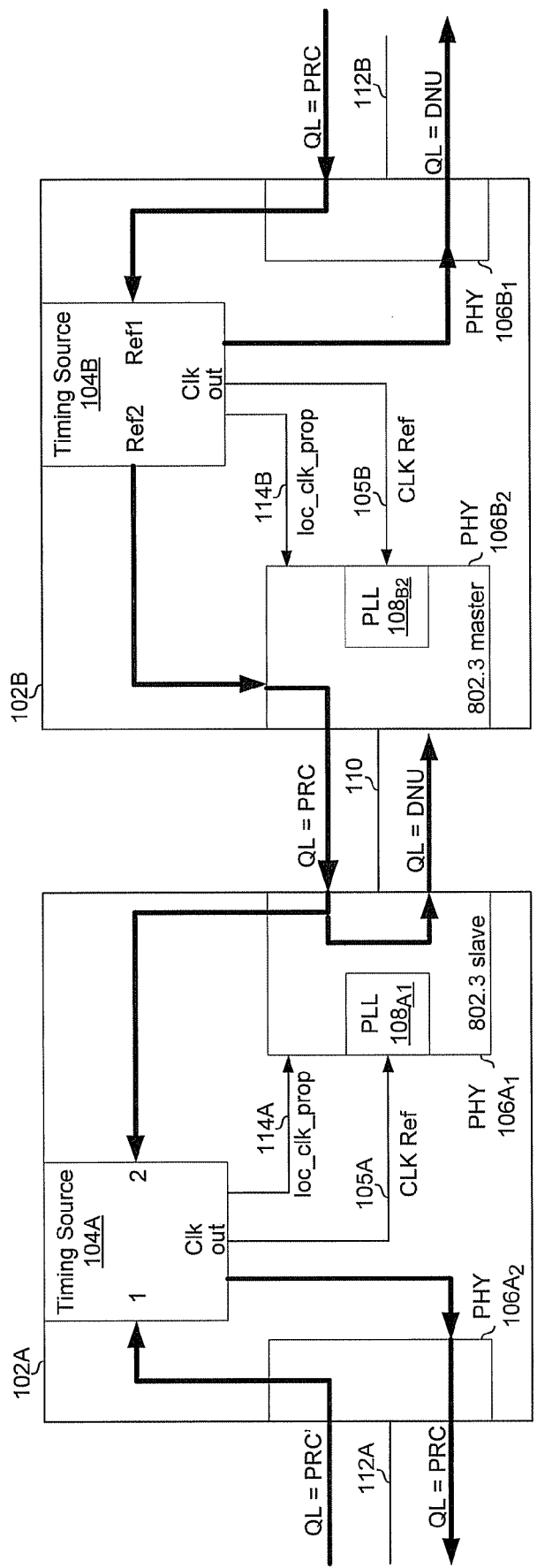
FIGS. 1 and 2 are block diagrams illustrating a pair of network devices operable to switch which device operates as timing master independent of which device operates as IEEE 802.3 master, in accordance with an embodiment of the invention.

Certain embodiments of a method and system for clock selection for synchronous Ethernet. In various embodiments of the invention, an Ethernet PHY may receive an indication from a local timing source that a local clock is suitable for propagation by the Ethernet PHY to a link partner of the Ethernet PHY. In response to receiving the indication from the local timing source, a timer in the Ethernet PHY may be started. In instances that the Ethernet PHY receives, during a time period subsequent to starting the timer and before the timer reaches a predetermined value, an indication that the link partner is propagating a clock that is suitable for the Ethernet PHY to synchronize to, the Ethernet PHY may be configured as timing slave. In instances that the Ethernet PHY does not receive, during the time period subsequent to starting the timer and before the timer reaches a predetermined value, an indication that the link partner is propagating a clock that is suitable for the Ethernet PHY to synchronize to, the Ethernet PHY may be configured as timing master upon the timer reaching the predetermined value. In instances that the Ethernet PHY is configured as timing master, upon receiving an indication that the link partner is propagating a clock for the Ethernet PHY to synchronize to, the Ethernet PHY may be configured based on whether the Ethernet PHY was configured as timing master prior to receiving the indication from the local timing source. In instances that the Ethernet PHY was configured as timing master prior to receiving the indication from the local timing source, the indication from the link partner may be ignored and the Ethernet PHY may remain configured as timing master. In instances that the Ethernet PHY was configured as timing slave prior to receiving the indication from the local timing source, the Ethernet PHY may be reconfigured as timing slave.

The indication received from the link partner may comprise a distinctively-encoded idle symbol. In instances that the Ethernet PHY is configured as timing master, the Ethernet PHY may transmit an indication that the Ethernet PHY is propagating a clock suitable for the link partner to synchronize to. Similarly, the indication transmitted by the Ethernet PHY may comprise a distinctively-encoded idle symbol. A configuration of the Ethernet PHY may transition from timing master to timing slave without changing a role of the Ethernet PHY as either IEEE 802.3 master or IEEE 802.3 slave. Similarly, a configuration of the Ethernet PHY may transition from timing slave to timing master without changing a role of the Ethernet PHY as either an IEEE 802.3 master or an IEEE 802.3 slave. In instances that the Ethernet PHY is configured as a timing slave, a clock of the Ethernet PHY may be synchronized to the clock propagated by the link partner. In instances that the Ethernet PHY is configured as a timing master, upon receiving an indication from the local timing source that the local clock is no longer suitable for propagation to the link partner, the Ethernet PHY may transmit an indication that the Ethernet PHY is no longer propagating a clock that is suitable for the link partner to synchronize to.

Figure 2:
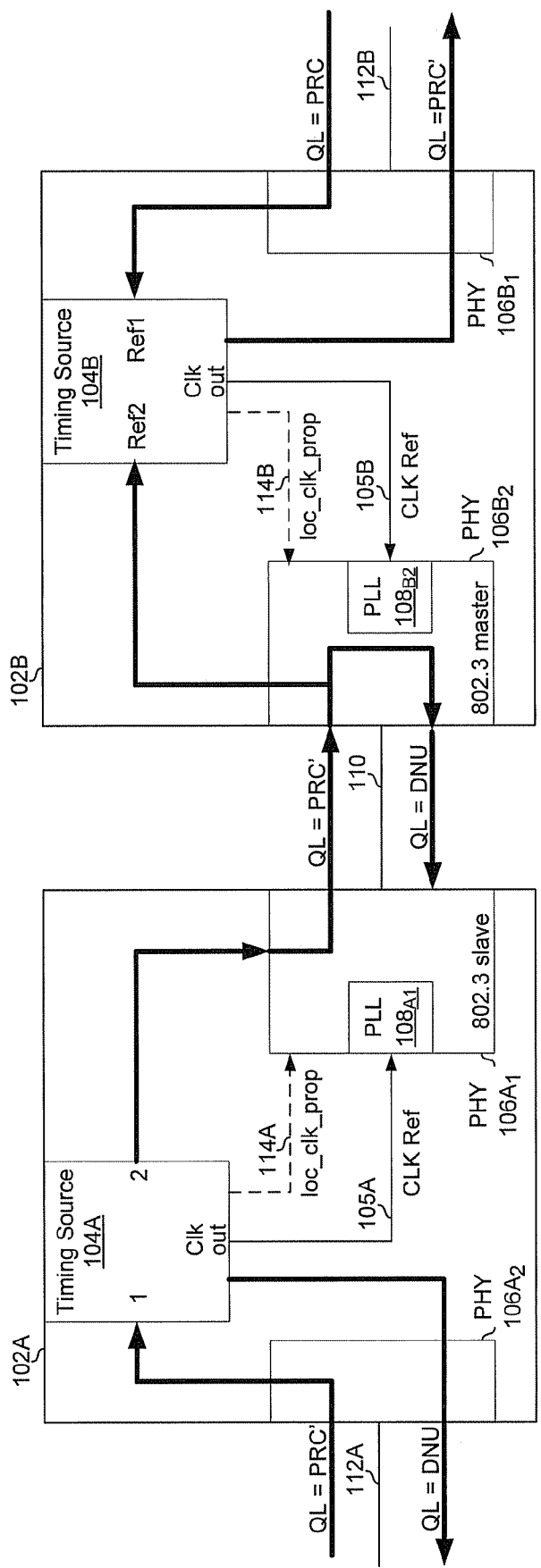

FIGS. 1 and 2 are block diagrams illustrating a pair of network devices operable to switch which device operates as timing master independent of which device operates as IEEE 802.3 master, in accordance with an embodiment of the invention. Referring to FIGS. 1 and 2, there is shown exemplary network devices 102A and 102B between which there is an active Ethernet physical layer (or similar) connection via link 110, where "active" means that communications may commence or continue without having to undergo autonegotiation or other similar connection-establishment routine. The exemplary network device 102A comprises a timing source 104A, and Ethernet PHYs $106A_1$ and $106A_2$. The exemplary network device 102B comprises a timing source 104B, and Ethernet PHYs $106B_1$ and $106B_2$. The timing sources 104A and 104B may each be referred to as a SETS (synchronous equipment timing source).

Each of the PHYs $106A_1$, $106A_2$, $106B_1$, and $106B_2$ may comprise suitable logic, circuitry, interfaces, and/or code that may enable communications in accordance with one or more Ethernet physical layer protocols such as, for example, 10BASE-X, 100BASE-X, 1GBASE-X, 10GBASE-X, 40GBASE-X, and 100GBASE-X, where 'X' is a refers to any of the various physical media types set forth in the IEEE 802.3 standard. Each of the PHYs $106A_1$, $106A_2$, $106B_1$, and $106B_2$ may comprise a PLL 108, or other clock generator, that may be utilized for transmission and reception of data. For synchronous Ethernet communications, the PLL 108 may be phase and/or frequency locked to the clock signal 105.

The timing source 104A may comprise suitable logic, circuitry, interfaces, and/or code that may be operable to perform various functions for supporting synchronous Ethernet communications. Exemplary functions may comprise clock generation and synchronization. The timing source 104A may operate at OSI layer 2 and/or higher OSI layers. The timing source 104A may generate a clock 105A which may be provided to the PHYs $106A_1$ and $106A_2$. The timing source 104A may be operable to synchronize the phase and/or frequency of the clock 105A to a selected reference clock. The selected reference clock may be dynamically selected from a plurality of available reference clocks. The selected reference clock may be selected in a manner that is transparent to the PHYs $106A_1$ and $106A_2$. For example, for PHYs $106A_1$ and $106A_2$ configured to communicate compliant with 100/1G/10GBASE-T, a change in selected reference clock may be done without the PHYs $106A_1$ and $106A_2$ losing their active physical Ethernet layer connection ("losing link-up") with their respective link partners. Thus, a change in the selected reference clock may occur without the network devices having to re-enter autonegotiation for communications over the link 110. To synchronize clock 105A to a first reference clock, PRC, the timing source 104A may utilize synchronization information received via the PHY $106A_1$. To synchronize clock 105A to a second reference clock, PRC', the timing source 104A may utilize synchronization information received via the PHY $106A_2$. The timing source 104A may be operable to output an indication of the selected reference clock to the PHYs $106A_1$ and $106A_2$. The signal 114A generated by the timing source 104A may indicate whether the timing source 104A has locked to a clock that is of sufficient stability/quality such that it is suitable for propagation to a link partner. For example, the signal 114A being asserted (i.e. "TRUE") may indicate that the reference clock PRC' meets phase and/or frequency stability requirements such that the PHY $106_{A1}$ and the PHY $106_{B2}$ would be enabled to communicate with the necessary time accuracy if they were both synchronized to PRC'. Conversely, the signal 114A being deasserted (i.e. "FALSE") may indicate that, for example, the reference clock PRC' does not meet phase and/or frequency stability requirements or does not have the best quality clocks among a plurality of available clocks. The timing source 104B may be substantially similar to the timing source 104A.

In operation of an exemplary embodiment of the invention, referring to FIG. 1, the PHYs $106A_1$ and $106B_2$ may be connected via the link 110 and may enter autonegotiation, or an equivalent procedure, to configure speed, duplex mode, and master/slave configuration. For purposes of illustration, it is assumed that the PHY $106A_1$ is configured to be the IEEE 802.3 slave and PHY $106B_2$ is configured to be the IEEE 802.3 master. A timing master may also be assigned during autonegotiation or shortly thereafter. In various embodiments of the invention, the default or initial timing master may be selected, for example, to be the IEEE 802.3 master, to be the IEEE 802.3 slave, or may be selected randomly or based on some other parameter such as a network address. For purposes of illustration, the remainder of this specification assumes that the IEEE 802.3 master is the default timing master upon link up. For purposes of illustration, it may be assumed that the PHYs $106A_2$ and $106B_1$ have active Ethernet physical layer connections to their respective link partners (not shown) via links 112A and 112B, respectively.

After a Ethernet physical layer connection is established between PHYs $106A_1$ and $106B_2$, normal data and/or idle symbols generated utilizing a first encoding corresponding to a first set of one or more PCS code-groups may be communicated over the link 110. These communications may include Ethernet Synchronization Message Channel (ESMC) messages, which may similarly be communicated over the link 112A and the link112B. The timing sources 104A and 104B may each utilize the ESMC messages in selecting a reference clock to which the clocks 105A and 105B, respectively, are synchronized.

In FIG. 1, the reference clock PRC, which reaches the network device 102B via the PHY $106B_1$, is the selected reference clock. Consequently, for the connection between the network device 102A and 102B, the network device 102B is configured as timing master and the network device 102A is configured as the timing slave. In such a scenario, signal 114A may be deasserted and signal 114B may be asserted.

In FIG. 2, the reference clock PRC', which reaches the network device 102A via the PHY $106A_2$, is the selected reference clock. Consequently, for the connection between the network device 102A and 102B, the network device 102A is configured as timing master and the network device 102B is configured as the timing slave. In such a scenario, signal 114A may be asserted and signal 114B may be deasserted. In FIG. 2, the PHY $106_{B2}$ remains IEEE 802.3 slave and PHY $106_{A1}$ remains IEEE 802.3 master, despite the switched timing roles.

Aspects of the invention enable transitioning from the configuration depicted in FIG. 1 to the configuration depicted in FIG. 2, without tearing down the Ethernet physical layer connection between network devices 102A and 102B. Furthermore, aspects of the invention enable transitioning from the configuration depicted in FIG. 1 to the configuration in FIG. 2 while reducing or eliminating discontinuities in clock phase and/or frequency. Additionally, aspects of the invention may enable selecting quickly and reliably selecting a timing master for a synchronous Ethernet link.

Figure 3:
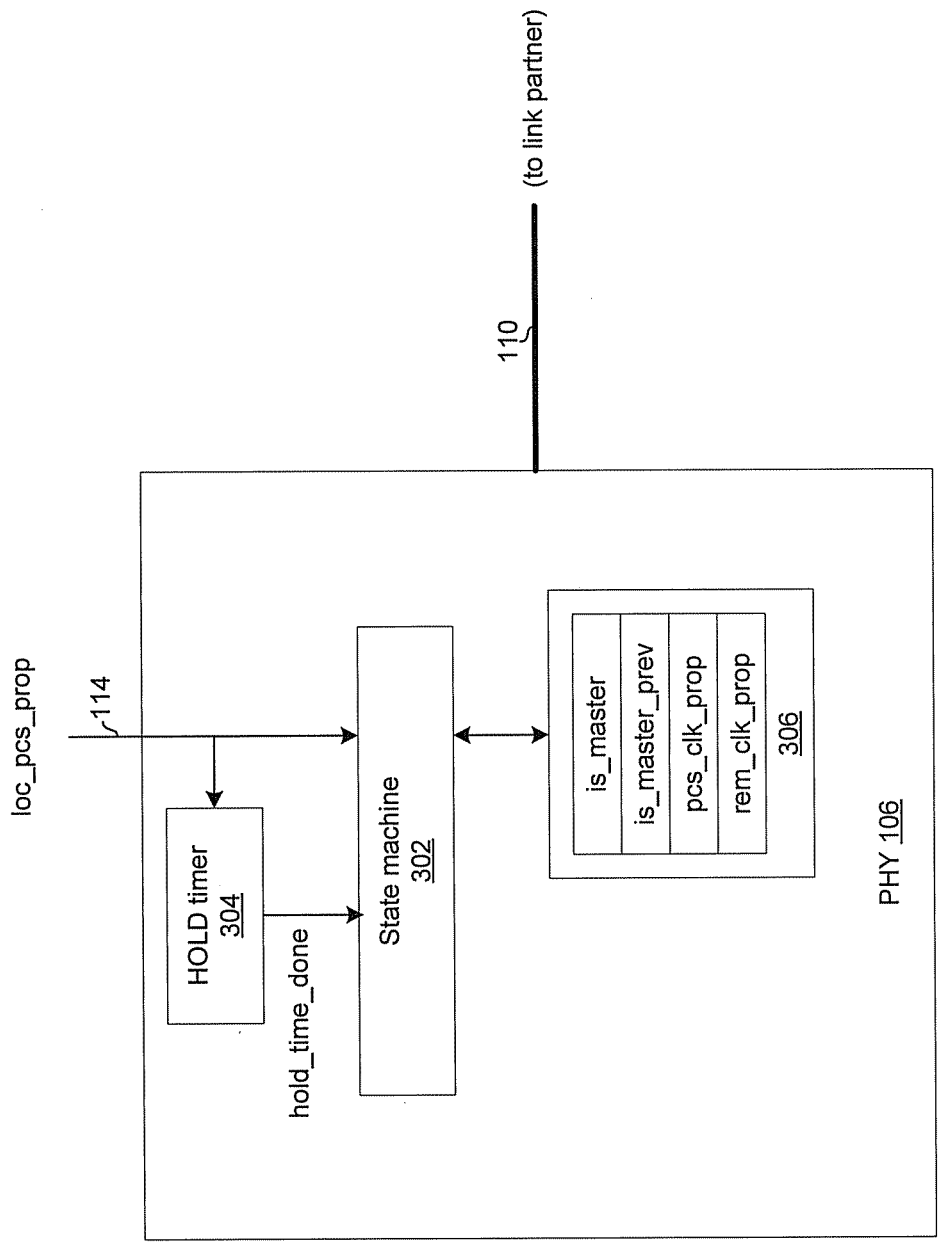
FIG. 3 is a block diagram of a Ethernet PHY, in accordance with an embodiment of the invention.

FIG. 3 is a block diagram of an Ethernet PHY, in accordance with an embodiment of the invention. Referring to FIG. 3, there is shown a PHY 106 comprising functional blocks 302-306. The functional block 302 may represent suitable logic, circuitry, interfaces, and/or code for implementing a state machine. The functional block 304 may represent suitable logic, circuitry, interfaces, and/or code for implementing a timer. The timer may comprise, for example, one or more hardware counters and/or one or more software counters. The functional block 306 may represent one or more registers which may store the state of the following registers: is_master, is_master_prev, pcs_clk_prop, and remclk_prop. Also shown is the signal loc_clk_prop 114 from the local timing source 104. For clarity of illustration, other functional blocks of the PHY 106 are not shown in FIG. 3.

This signal loc_clk_propr 114 may indicate that the local timing source 104 is synchronized to a clock not received via the Ethernet PHY 106, and that clock is of sufficient quality that the PHY 106 may function as a timing master and propagate the clock to its corresponding link partner. Upon the signal loc_clk_prop 114 being asserted by the timing source 104, the PHY 106 may enter a HOLD state.

Upon completion of the HOLD state, triggered by assertion of the signal hold_time_done, the register pcs_clk_prop may be asserted. Deassertion of the register pcs_clk_prop may not wait for a hold period but may shortly follow—after gate and/or processing delays, for example—deassertion of the signal loc_clk_prop 114. When the register pcs_clk_prop is asserted, the PHY 106 may send an indication to its link partner that the PHY 106 is propagating a clock that is suitable for the link partner to synchronize to. In an exemplary embodiment of the invention, such an indication may comprise one or more distinctively-encoded idle symbols. A distinctively-encoded idle symbol may, for example, be encoded utilizing a second pcs code-group that is mutually exclusive with a first code group utilized for sending other idles symbols. The register pcs_clk_prop may be TRUE when (loc_clk_prop=TRUE) AND (hold_time_done=TRUE) AND [(rem_clk_prop=FALSE) OR [(rem_clk_prop=TRUE) AND (is_master_prev=TRUE)]].

The register rem_clk_prop may be asserted upon the PHY 106 receiving an indication from its link partner that the link partner is propagating a clock that is suitable for the PHY 106 to synchronize to. In an embodiment of the invention, the indication from the link partner may comprise one or more distinctively-encoded idle symbols. In an embodiment of the invention, the register rem_clk_prop may remain asserted until the PHY 106 receives an indication that the link partner is no longer propagating a clock that is suitable for the PHY 106 to synchronize to. Such an indication may comprise an idle that is encoded differently than the distinctively-encoded idle that caused the assertion of the register rem_clk_prop.

The register is_master may be asserted when the PHY 106 is a timing master and may be deasserted when the PHY 106 is a timing slave. The value of the register is_master may be updated upon the PHY 106 exiting a HOLD state (the HOLD state is described below with respect to FIG. 4). When the PHY 106 enters the HOLD state, the value of the register is_master in the PHY 106 may be copied to the is_master_prev register in the PHY 106. In this manner, the register is_master in the PHY 106 being and the register is_master_prev in the PHY 106 being different after the PHY 106 has been in the HOLD state may indicate that the value of the register is_master changed during or upon exiting the HOLD state.

Figure 4:
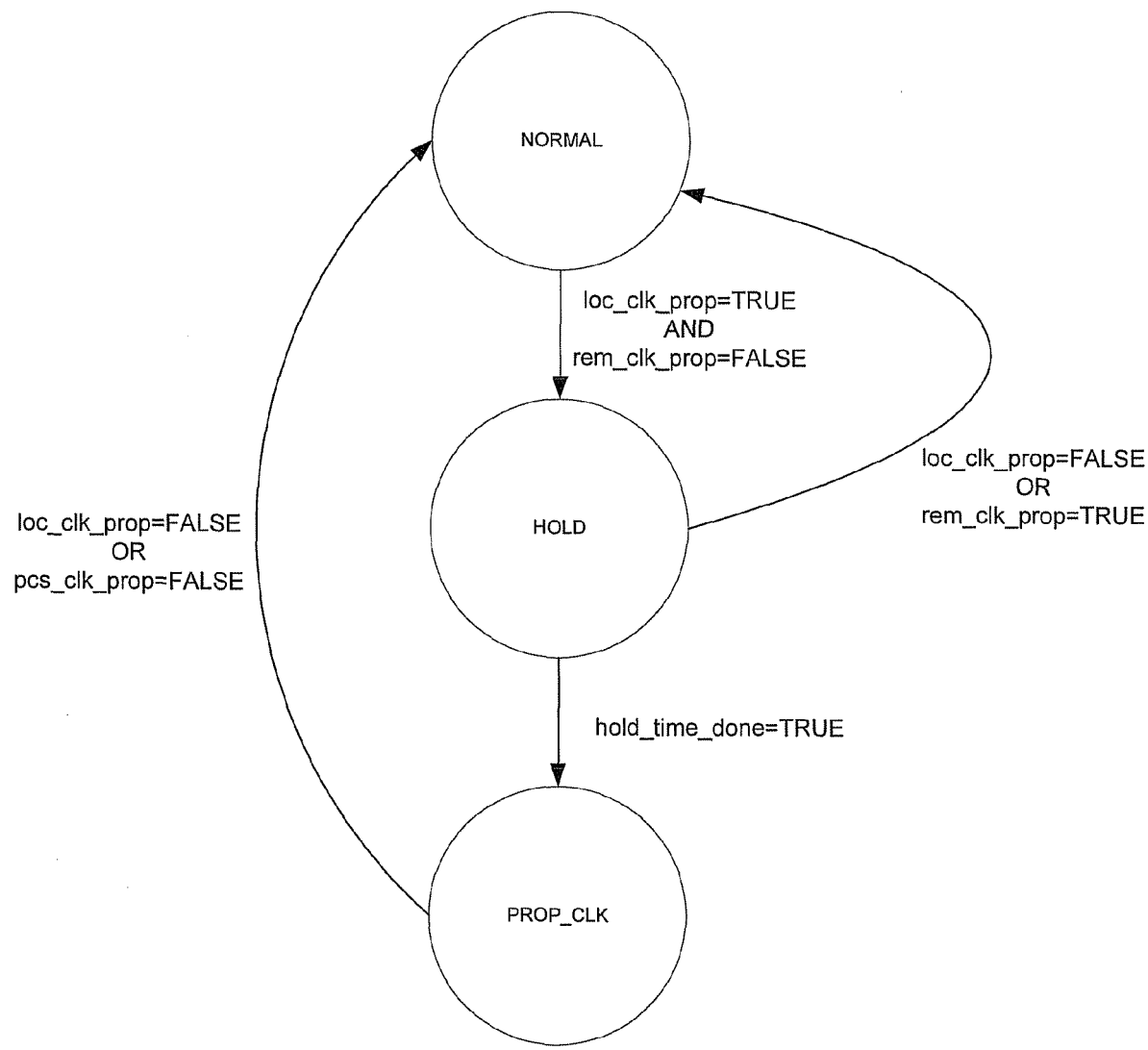
FIG. 4 is a state diagram illustrating exemplary states of an Ethernet PHY, in accordance with an embodiment of the invention.

FIG. 4 is a state diagram illustrating exemplary states of an Ethernet PHY, in accordance with an embodiment of the invention. In an exemplary embodiment of the invention, the PHY 106 may have three operational states pertaining to synchronous Ethernet communications—a NORMAL state, a HOLD state, and a PROP_CLK state.

While in the NORMAL state, the PHY 106 may communicate standard idle and/or data symbols. While in the NORMAL state, the PHY 106 may not propagate a clock that is suitable for the link partner to synchronize to. While in the NORMAL state, the PHY 106 and its link partner may communicate asynchronously or the PHY 106 may synchronize to a clock propagated to it by the link partner.

Upon entering the HOLD state, the HOLD timer may be initialized and begin counting to a determined value. The determined value may be determined at or before initialization of the timer. The determined value may be pre-configured by a network administrator and/or may be dynamically determined during operation of the PHY 106. Upon reaching the predetermined value, the signal hold_time_done may be asserted. If the PHY 106 is still in the HOLD state upon hold_time_done being asserted, the PHY 106 may transition from the HOLD state to the PROP_CLK state.

While in the PROP_CLK state, the PHY 106 may send one or more indications to its link partner that the PHY 106 is propagating a clock suitable for the link partner to synchronize to. In an embodiment of the invention, idle symbols transmitted by the PHY 106 while in the PROP_CLK state may be distinctively-encoded such that the link partner may recognize them as indications that the PHY 106 is propagating a clock to the link partner.

In operation, upon power up or reset, the PHY 106 may establish an active Ethernet physical layer Ethernet connection with its link partner (i.e., "link up"). This establishing of the connection may include autonegotiation. The PHY 106 may then enter the NORMAL state. The PHY 106 may transition from the NORMAL state to the HOLD state upon the signal loc_clk_prop being TRUE and the register rem_clk_prop being FALSE. Upon entering the HOLD state, the hold timer may be initialized and begin counting.

While the PHY 106 is in the HOLD state, if the signal loc_clk_prop is deasserted (i.e. becomes FALSE) or the register rem_clk_prop is asserted (i.e. becomes TRUE) before the hold timer reaches a predetermined count, the PHY 106 may transition back to the NORMAL state. This may occur, for example, when both timing sources 104 associated with the link 110 are locked to clocks of sufficient quality, but the link partner has won the "race" to become timing master (see FIGS. 6A and 6B below). If the PHY 106 stays in the HOLD state until holdtime_done is asserted, then the PHY 106 may transition to the PROP_CLK state.

While in the PROP_CLK state, the PHY 106 may propagate its clock to its link partner. While in the PROP_CLK state, the PHY 106 may send an indication to its link partner that it is propagating its clock to the link partner. In an embodiment of the invention, the indication may comprise one or more distinctively-encoded idle symbols that the link partner may recognize as being an indication that the PHY 106 is propagating its clock to the link partner. In an embodiment of the invention, all idle symbols sent by the PHY 106 while the PHY 106 is in the PROP_CLK state may be distinctively-encoded idle symbols which indicate that the PHY 106 is propagating a clock suitable for its link partner to synchronize to. If either or both of the loc_clk_prop signal and the pcs_clk_prop register are deasserted, the PHY 106 may transition to the NORMAL state.

Figure 5:
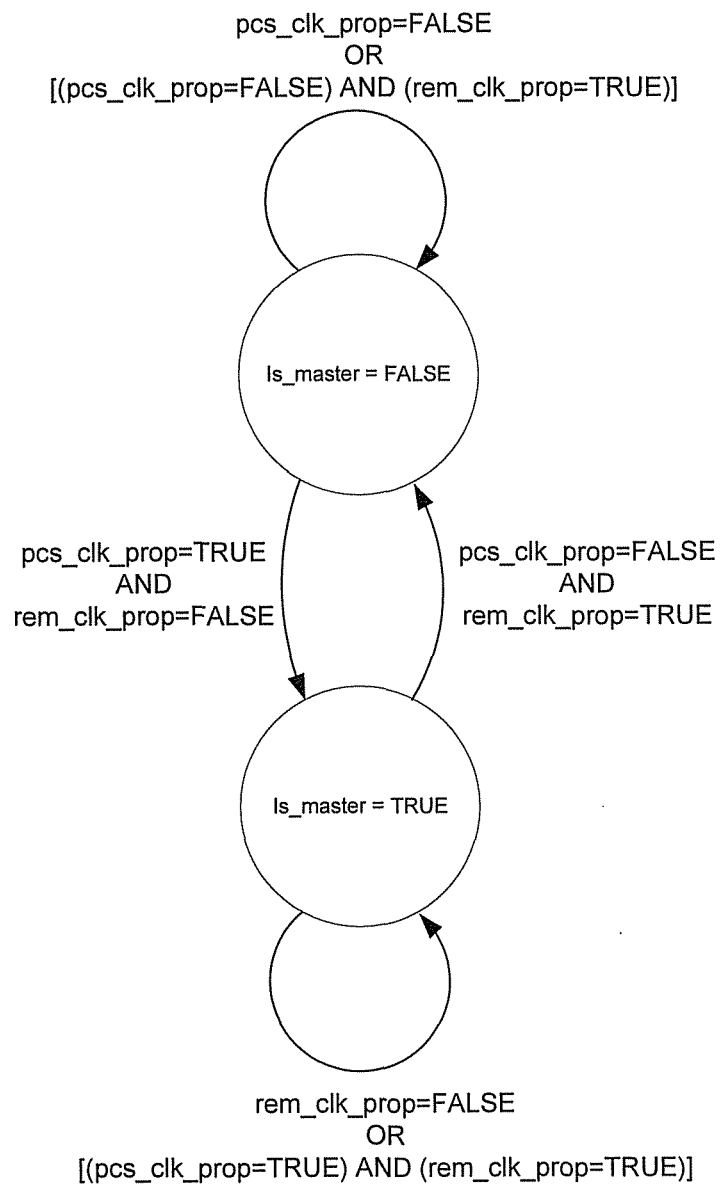
FIG. 5 is a diagram illustrating the state of the register is_master, in accordance with an embodiment of the invention.

FIG. 5 is a diagram illustrating the state of the register is_master, in accordance with an embodiment of the invention. In operation, the register is_master may be a one-bit register. In an embodiment of the invention, upon link-up, is_master in the IEEE 802.3 master may default to TRUE upon link up, and is_master in the IEEE 802.3 slave may default to FALSE upon link up. Upon a condition where the register pcs_clk_prop is FALSE and the register rem_clk_prop is TRUE, the register is_master may transition from TRUE to FALSE. Upon a condition where the register pcs_clk_prop is TRUE and the register rem_clk_prop is FALSE, the register is_master may transition from FALSE to TRUE.

In FIGS. 6A-8, Δ is utilized to generically represent processing and/or gate delays. Each delay, Δ, shown in the figures does not necessarily have the same value.

Figure 6A:
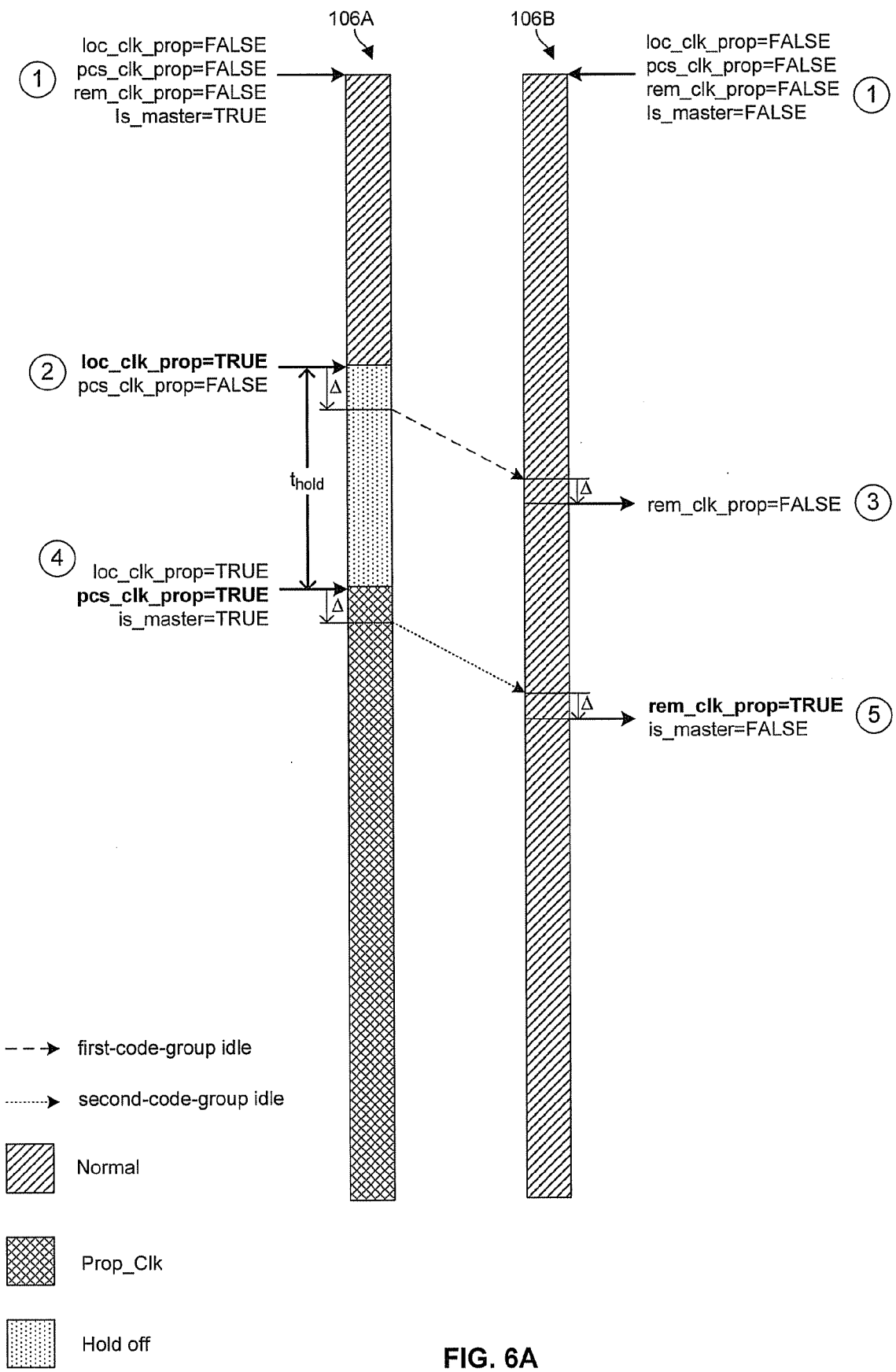
FIG. 6A is a diagram illustrating a scenario in which two Ethernet PHYs link up, then the IEEE 802.3 master is selected as timing master, in accordance with an embodiment of the invention.

FIG. 6A is a diagram illustrating a scenario in which two Ethernet PHYs link up, then the IEEE 802.3 master is selected as timing master, in accordance with an embodiment of the invention. Referring to FIG. 6A, at time instant 1 (indicated by the circled '1'), the PHYs 106A and 106B may have just completed link up with the PHY 106A having been selected as IEEE 802.3 master. Accordingly, the register is_master in the PHY 106A is TRUE and the register is_master in the PHY 106B is FALSE.

At time instant 2, the timing source 104A may assert the signal loc_clk_prop to the PHY 106A. In response, the PHY 106A may transition to the HOLD state and the register pcs_clk_prop may remain FALSE. In the exemplary embodiment of the invention depicted in FIG. 6A, distinctively-encoded idles are utilized to indicate to a link partner that a clock is being propagated for the link partner to synchronize to. An exemplary idle symbol transmitted at time instant 2, and received at PHY 106B at time instant 3 illustrates that, because the register pcs_clk_prop remains FALSE during the HOLD state, idle symbols transmitted during the hold state are not distinctively-encoded to cause the register rem_clk_prop in PHY 106B to be asserted. Accordingly, the register rem_clk_prop in the PHY 106B remains FALSE at time instant 3.

At time instant 4, the signal hold_time_done in the PHY 106A is asserted causing the PHY 106A to transition to the PROP_IDLE state. In response, the register pcs_clk_prop in the PHY 106A is asserted at time instant 4 and an indication of such is transmitted to the PHY 106B, where it is received at time instant 5. Upon receiving the indication, the register rem_clk_prop in the PHY 106B is asserted.

Thus, at time instant 4 the PHY 106A has been configured as timing master and at time instant 5 the PHY 106B has been configured as timing slave. These configurations match the default configurations that had been in place at time instant 1.

Figure 6B:
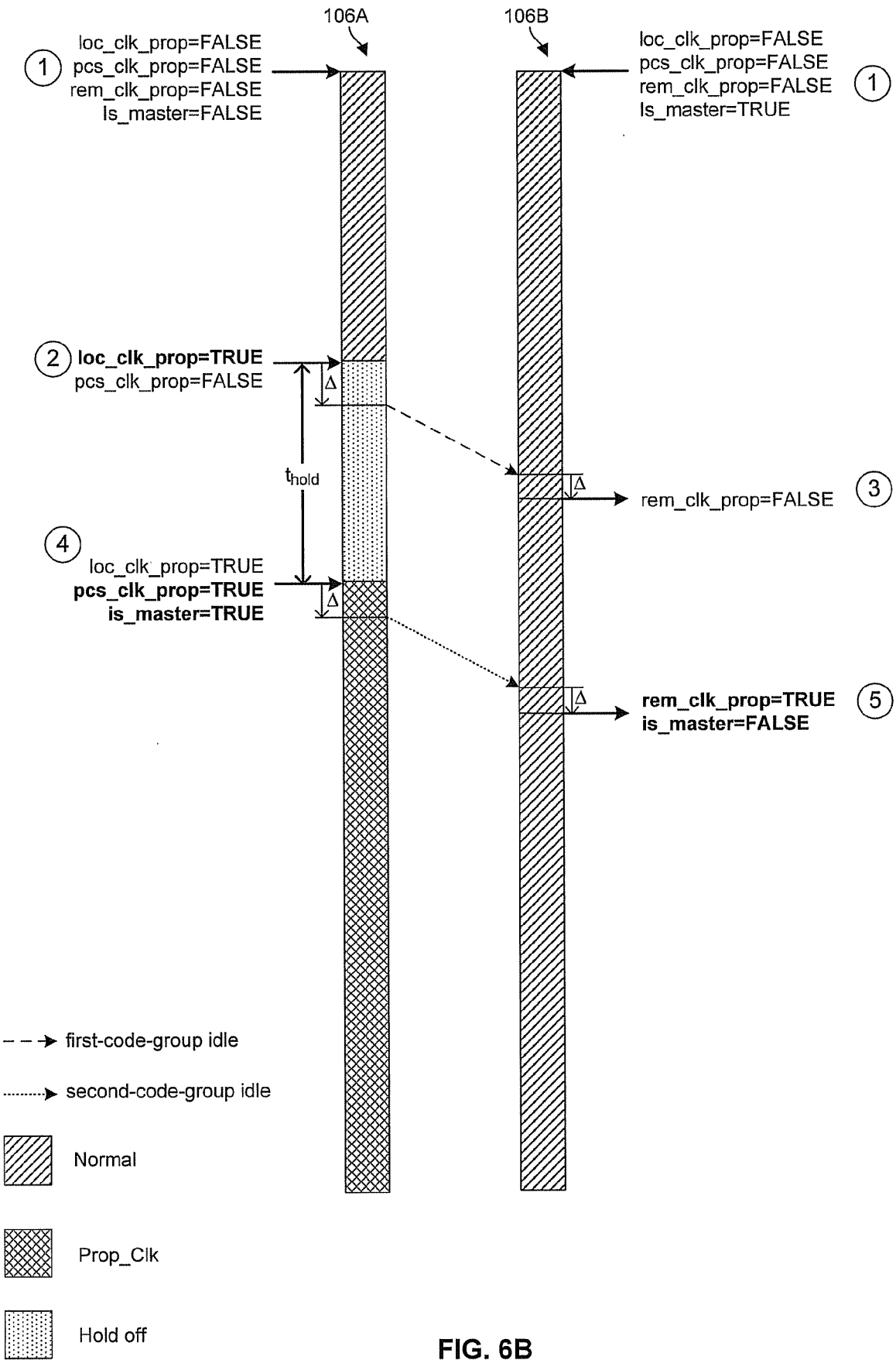
FIG. 6B is a diagram illustrating a scenario in which two Ethernet PHYs link up, then the IEEE 802.3 master is selected as timing slave, in accordance with an embodiment of the invention.

FIG. 6B is a diagram illustrating a scenario in which two Ethernet PHYs link up, then the IEEE 802.3 master is selected as timing slave, in accordance with an embodiment of the invention. Referring to FIG. 6B, at time instant 1 the PHYs 106A and 106B may have just completed link up with the PHY 106A having been selected as IEEE 802.3 slave and the PHY 106B having been selected as IEEE 802.3 master. Accordingly, the register is_master in the PHY 106A is FALSE and the register is_master in the PHY 106B is TRUE.

At time instant 2, the timing source 104A may assert the signal loc_clk_prop to the PHY 106A. In response, the PHY 106A may transition to the HOLD state and the register pcs_clk_prop in the PHY 106A may remain FALSE. In the exemplary embodiment of the invention depicted in FIG. 6B, distinctively-encoded idles are utilized to indicate to a link partner that a clock is being propagated for the link partner to synchronize to. An exemplary idle symbol transmitted at time instant 2, and received at PHY 106B at time instant 3 illustrates that, because pcs_clk_prop in the PHY 106A remains FALSE during the HOLD state, idle symbols transmitted by the PHY 106A during the hold state are not distinctively-encoded to cause the register rem_clk_prop in PHY 106B to be asserted. Accordingly, the register rem_clk_prop in the PHY 106B remains FALSE at time instant 3.

At time instant 4, the signal hold_time_done in the PHY 106A is asserted causing the PHY 106A to transition to the PROP_IDLE state. In response, the register pcs_clk_prop in the PHY 106A is asserted at time instant 4 and an indication of such is transmitted to the PHY 106B, where it is received at time instant 5. Upon receiving the indication, the register rem_clk_prop in the PHY 106B is asserted. The assertion of the register rem_clk_prop in PHY 106B causes the register is_master in PHY 106B to be deasserted.

Thus, at time instant 4 the PHY 106A has been configured as timing master and at time instant 5 the PHY 106B has been configured as timing slave. These configurations are the reverse of the default configurations that had been in place at time instant 1.

Figure 6C:
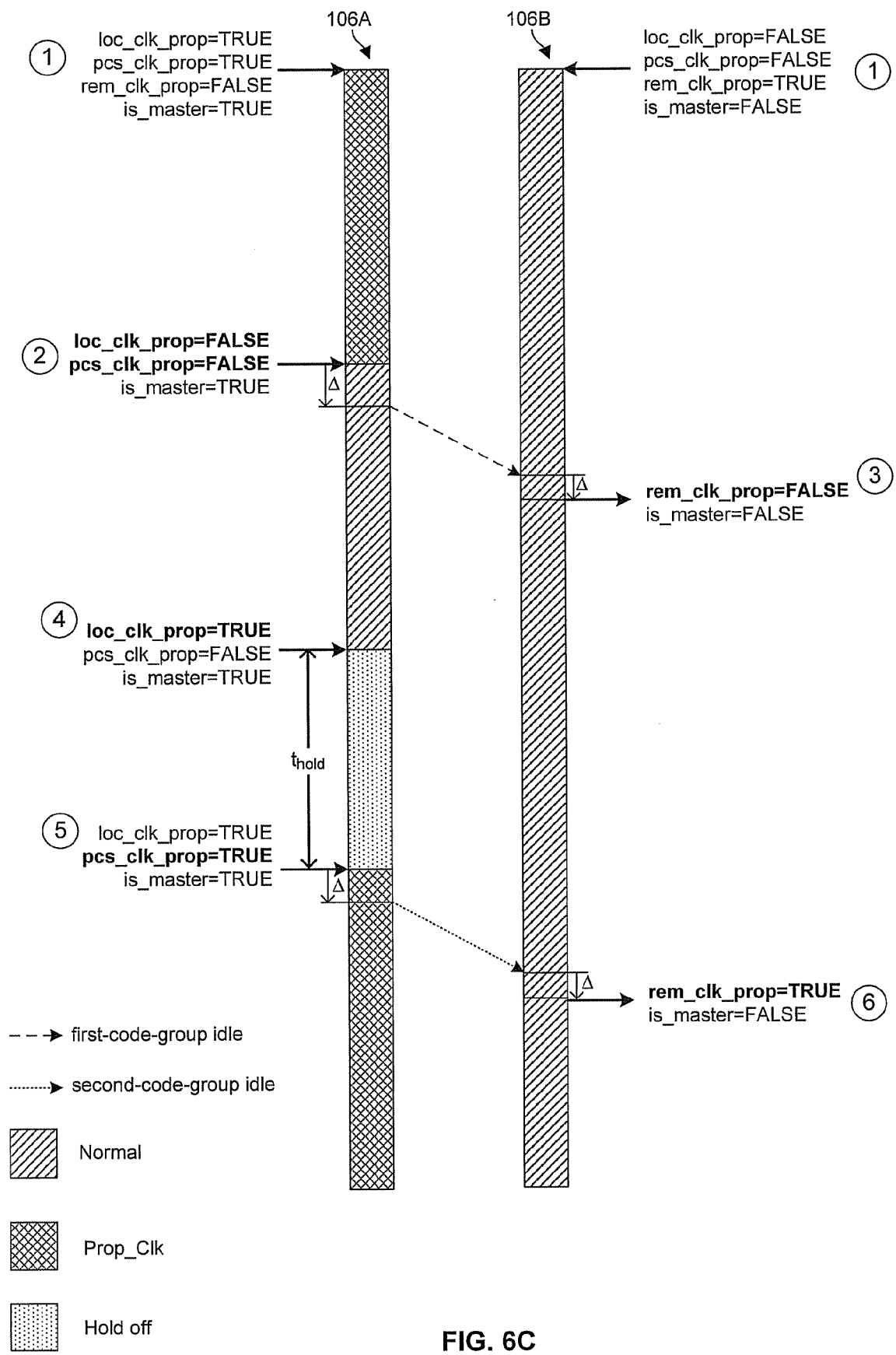
FIG. 6C is a diagram illustrating a scenario in which an Ethernet PHY operating as timing master enters a HOLD state, and then is reselected as timing master, in accordance with an embodiment of the invention.

FIG. 6C is a diagram illustrating a scenario in which an Ethernet PHY operating as timing master enters a HOLD state, and then is reselected as timing master, in accordance with an embodiment of the invention. Referring to FIG. 6C, at time instant 1, the PHY 106A may be in the PROP_CLK state and may be the timing master, the PHY 106B may be in the NORMAL state and may be the timing slave. Accordingly, the PHY 106B may be synchronized to a clock propagated by the PHY 106A.

At time instant 2, timing source 104A may deassert the signal loc_clk_prop. This may be the result, for example, of the timing source 104A determining that PRC' is no longer of sufficient quality. In response to the signal loc_clk_prop from timing source 104A being deasserted, the register pcs_clk_prop in the PHY 106A may be deasserted. Upon the deassertion of the register pcs_clk_prop in the PHY 106A, the PHY 106A may transmit an indication that it is no longer propagating a clock that is suitable for PHY 106B to synchronize to. The indication may be received at the PHY 106B at time instant 3. In response to the indication received at time instant 3, the register rem_clk_prop in the PHY 106B may be deasserted.

At time instant 4, timing source 104A may assert the signal loc_clk_prop to the PHY 106A. This may be the result of, for example, timing source 104A having selected a different reference clock or the quality of PRC' having improved. In response to loc_clk_prop being asserted, the PHY 106A may enter the HOLD state.

At time instant 5, the hold_time_done in the PHY 106A may be asserted and the PHY 106A may transition to the PROP_IDLE state. In response, the register pcs_clk_prop in the PHY 106A may be asserted and the PHY 106A may transmit indication that the PHY 106A is propagating a clock suitable for the link partner to synchronize to. The indication may be received at the PHY 106B at time instant 6. Upon receiving the indication at time instant 6, the register rem_clk_prop in the PHY 106B may be asserted.

Thus, at time instant 5 the PHY 106A has been configured as timing master and at time instant 6 the PHY 106B has been configured as timing slave. These configurations may be the same as the configurations that were in place prior to time instant 2.

Figure 6D:
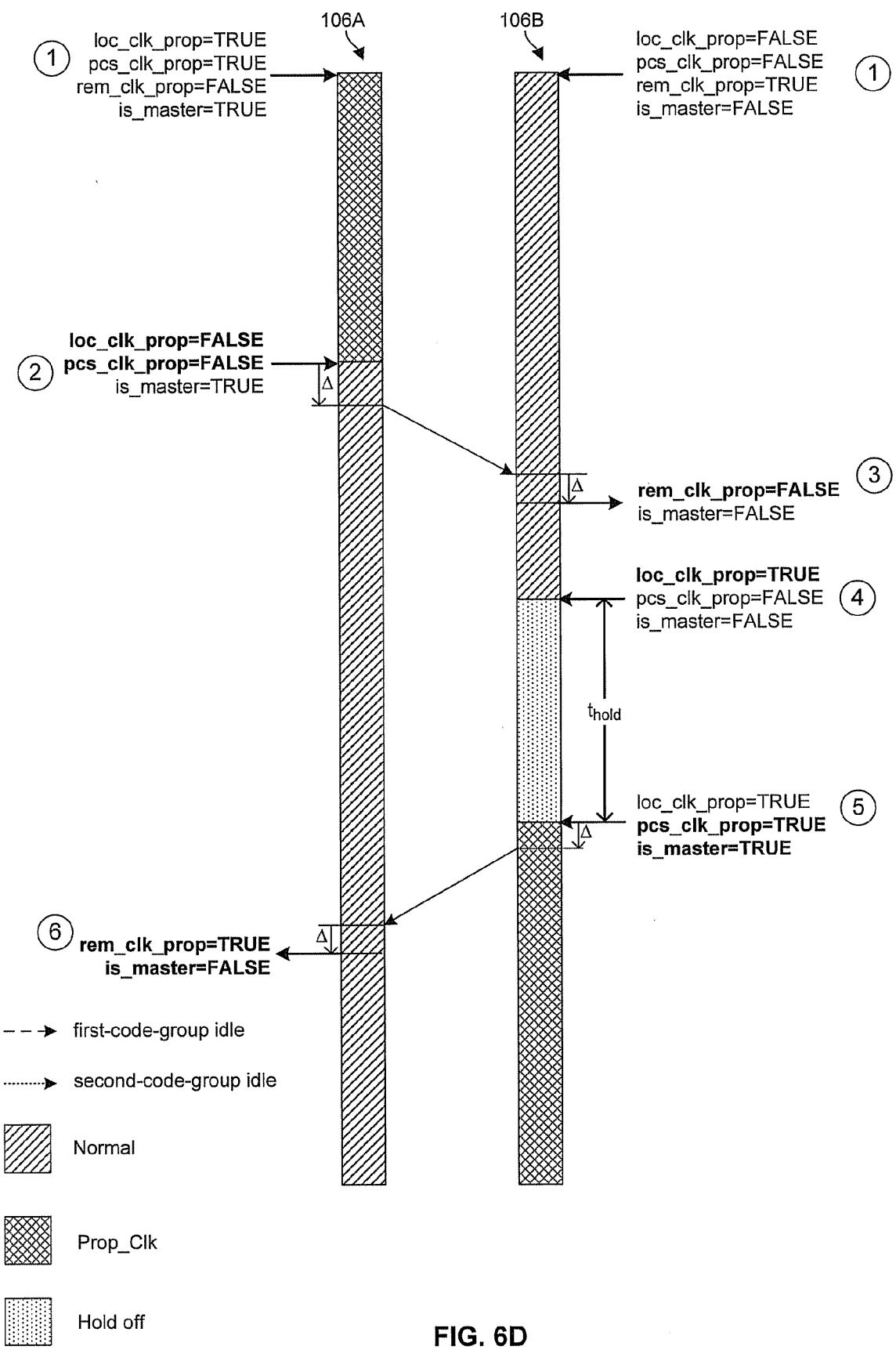
FIG. 6D is a diagram illustrating a scenario in which an Ethernet PHY operating as timing master enters a HOLD state, and then its link partner gets selected as timing master, in accordance with an embodiment of the invention.

FIG. 6D is a diagram illustrating a scenario in which an Ethernet PHY operating as timing master enters a HOLD state, and then its link partner gets selected as timing master, in accordance with an embodiment of the invention. Referring to FIG. 6D, at time instant 1, the PHY 106A may be in the PROP_CLK state and may be timing master, the PHY 106B may be in the NORMAL state and may be timing slave. Accordingly, the PHY 106B may be synchronized to a clock propagated by the PHY 106A.

At time instant 2, timing source 104A may deassert loc_clk_prop. This may be the result, for example, of the timing source 104A determining that PRC' is no longer of sufficient quality. In response to loc_clk_prop being deasserted, the register pcs_clk_prop in the PHY 106A may be deasserted. Upon the deassertion of the register pcs_clk_prop in the PHY 106A, the PHY 106A may transmit an indication that it is no longer propagating a clock that is suitable for PHY 106B to synchronize to. The indication may be received at the PHY 106B at time instant 3. In response to the indication received at time instant 3, the register rem_clk_prop in the PHY 106B may be deasserted.

At time instant 4, timing source 104B may assert the signal loc_clk_prop to the PHY 106B. This may be the result of, for example, timing source 104B having selected a different reference clock, or the quality of PRC having improved. In response to the timing source 104B asserting the signal loc_clk_prop, the PHY 106B may enter the HOLD state.

At time instant 5, the signal hold_time_done in the PHY 106B may be asserted and the PHY 106A may transition to the PROP_IDLE state. Accordingly, the register pcs_clk_prop in the PHY 106B may be asserted at time instant 4 and the PHY 106B may transmit an indication that it is propagating a clock suitable for the PHY 106A to synchronize to. The PHY 106A may receive the indication at time instant 6. Upon receiving the indication, the register rem_clk_prop in the PHY 106A is asserted.

Thus, at time instant 5 the PHY 106B has been configured as a timing master and at time instant 6 the PHY 106A has been configured as a timing slave. These configurations are the opposite of the configurations that had been in place prior to time instant 2.

Figure 7A:
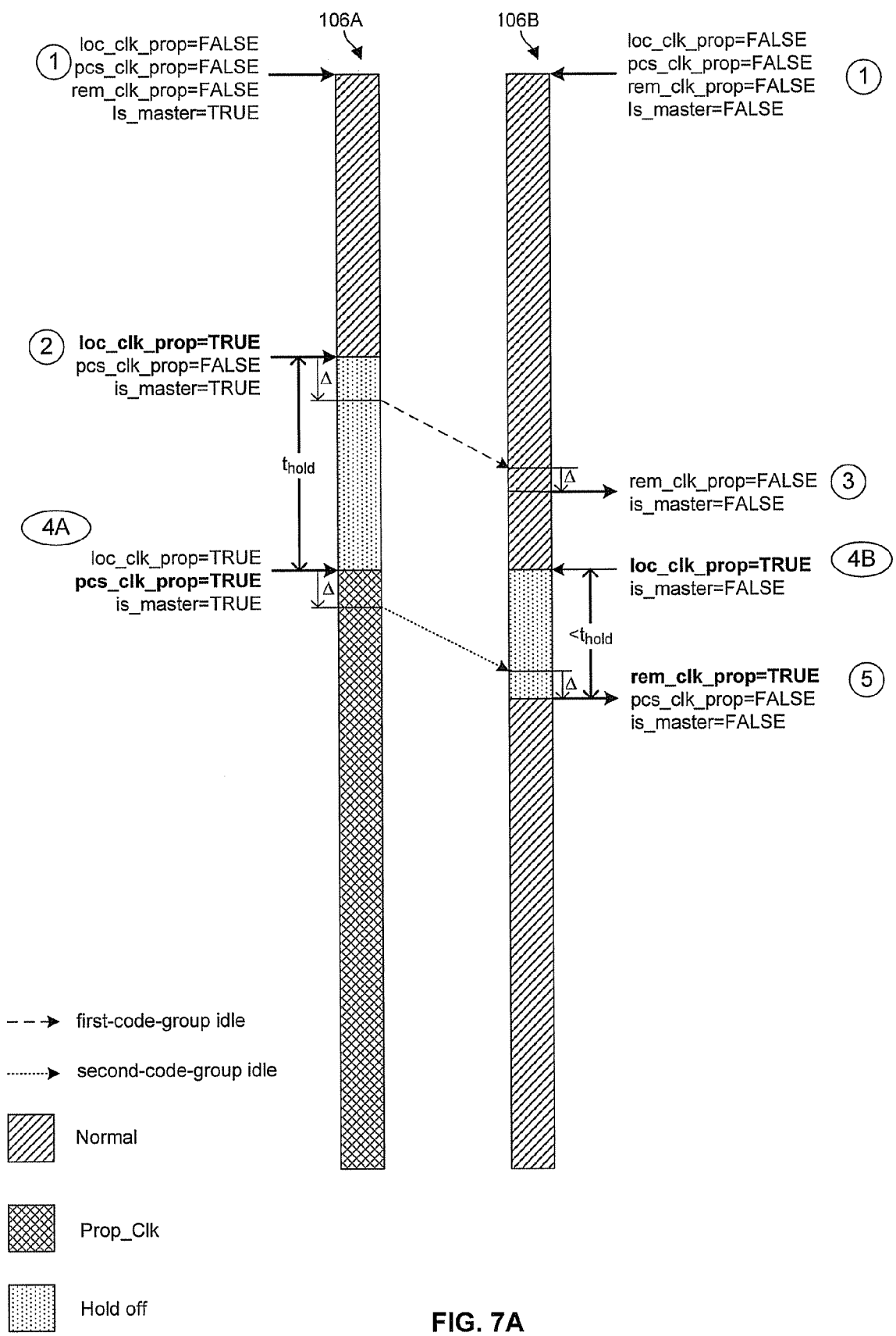
FIG. 7A is a diagram illustrating a scenario in which two Ethernet PHYs link up, both devices indicate an ability to be timing master, and the conflict is resolved with the default timing master remaining as timing master, in accordance with an embodiment of the invention.

FIG. 7A is a diagram illustrating a scenario in which two Ethernet PHYs link up, both devices indicate an ability to be timing master, and the conflict is resolved with the default timing master remaining as timing master, in accordance with an embodiment of the invention. Referring to FIG. 7A, at time instant 1 the PHYs 106A and 106B may have just completed link up with the PHY 106A having been selected as IEEE 802.3 master and the PHY 106B as timing slave. Accordingly, the register is_master in the PHY 106A may be TRUE and the register is_master in the PHY 106B may be FALSE.

At time instant 2, the timing source 104A may assert loc_clk_prop to the PHY 106A. In response, the PHY 106A may transition to the HOLD state and the register pcs_clk_prop in the PHY 106A may remain FALSE. In the exemplary embodiment of the invention depicted in FIG. 7A, distinctively-encoded idles are utilized to indicate to a link partner that a clock is being propagated for the link partner to synchronize to. An exemplary idle symbol transmitted at time instant 2, and received at the PHY 106B at time instant 3 illustrates that, because the register pcs_clk_prop in the PHY 106A remains FALSE during the HOLD state, idle symbols transmitted by the PHY 106A during the hold state are not distinctively-encoded to cause the register rem_clk_prop in PHY 106B to be asserted. Accordingly, the register rem_clk_prop in the PHY 106B remains FALSE at time instant 3.

At time instant 4A, the signal hold_time_done in PHY 106A is asserted. In response, the PHY 106A transitions to the PROP_IDLE state and PHY 106A transmits an indication that it is propagating a clock that is suitable for the PHY 106B to synchronize to. The indication is received at PHY 106B at time instant 5.

At time instant 4B, which is close in time to time instant 4A, before time instant 5, timing source 104B may assert the signal loc_clk_prop to the PHY 106B. This may result from, for example, timing source 104B selecting a new reference clock, or PRC having improved in quality. In response to the signal loc_clk_prop from the timing source 104B being asserted, the PHY 106B may transition to the HOLD state at time instant 4B.

At time instant 5, the indication sent by PHY 106A at time instant 4A may be received by the PHY 106B while PHY 106B is still in HOLD (i.e. before hold_time_done in PHY 106B is asserted). In response to the indication, the register rem_clk_prop in the PHY 106B may be asserted causing the PHY 106B to transition to the NORMAL state. Thus, despite the fact that both timing sources 104A and 104B have indicated that their respective PHYs 106A and PHY 106B could function as timing master, the PHY 106A, which had been the previous timing master, won the contention or "race" and remained as timing master.

Figure 7B:
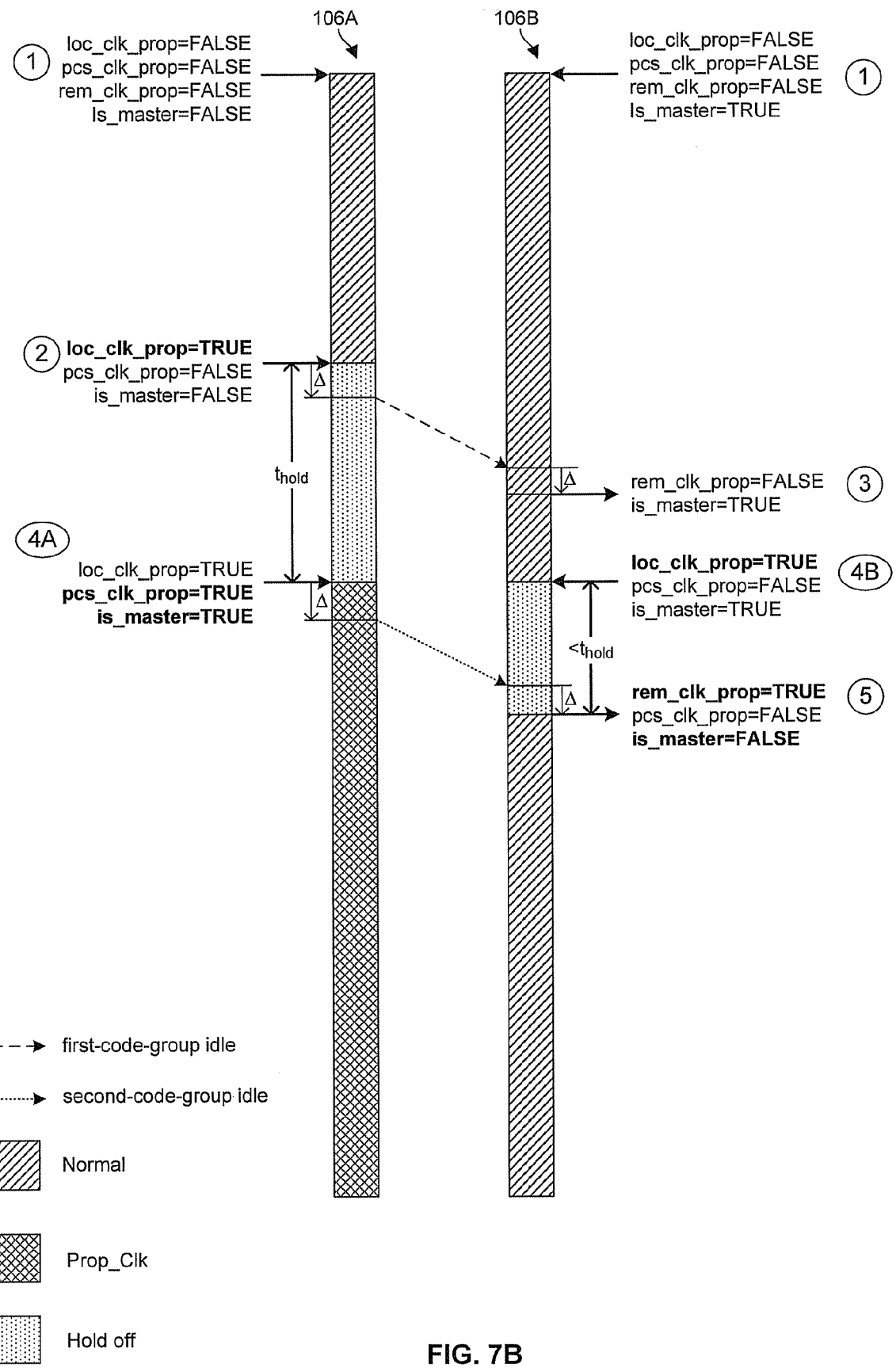
FIG. 7B is a diagram illustrating a scenario in which two Ethernet PHYs link up, both devices indicate an ability to be timing master, and the conflict is resolved with the default timing slave being selected as timing master, in accordance with an embodiment of the invention.

FIG. 7B is a diagram illustrating a scenario in which two Ethernet PHYs link up, both devices indicate an ability to be timing master, and the conflict is resolved with the default timing slave being selected as timing master, in accordance with an embodiment of the invention. Referring to FIG. 7B, at time instant 1 the PHYs 106A and 106B may have just completed link up with the PHY 106B having been selected as IEEE 802.3 master and the PHY 106A as timing slave. Accordingly, the register is_master in the PHY 106A may be FALSE and the register is_master in the PHY 106B may be TRUE.

At time instant 2, the timing source 104A may assert the signal loc_clk_prop to the PHY 106A. In response, the PHY 106A may transition to the HOLD state and the register pcs_clk_prop in the PHY 106A may remain FALSE. In the exemplary embodiment of the invention depicted in FIG. 7B, distinctively-encoded idles are utilized to indicate to a link partner that a clock is being propagated for the link partner to synchronize to. An exemplary idle symbol transmitted at time instant 2, and received at PHY 106B at time instant 3 illustrates that, because the register pcs_clk_prop in the PHY 106A remains FALSE during the HOLD state, idle symbols transmitted during the hold state are not distinctively-encoded to cause the register rem_clk_prop in PHY 106B to be asserted. Accordingly, the register rem_clk_prop in the PHY 106B remains FALSE at time instant 3.

At time instant 4A, the signal hold_time_done in PHY 106A is asserted. In response, the PHY 106A transitions to the PROP_IDLE state and PHY 106A transmits an indication that it is propagating a clock that is suitable for the PHY 106B to synchronize to. The indication is received at PHY 106B at time instant 5.

At time instant 4B, which is close in time to time instant 4A, before time instant 5, timing source 104B may assert the signal loc_clk_prop to the PHY 106B. This may result from, for example, timing source 104B selecting a new reference clock, or PRC having improved in quality. In response to locclkprop being asserted by the timing source 104B, the PHY 106B may transition to the HOLD state at time instant 4B.

At time instant 5, the indication sent by PHY 106A at time instant 4A may be received by the PHY 1068 PHY 106B is still in HOLD (i.e. before hold_time_done in PHY 106B is asserted). In response to the indication, the register rem_clk_prop in the PHY 106B may be asserted causing the PHY 106B to transition to the NORMAL state. Thus, despite the fact that both timing sources 104A and 104B have indicated that their respective PHYs 106A and PHY 106B could function as timing master, PHY 106A, which had been the previous timing slave, won the "race" and became timing master.

Figure 8:
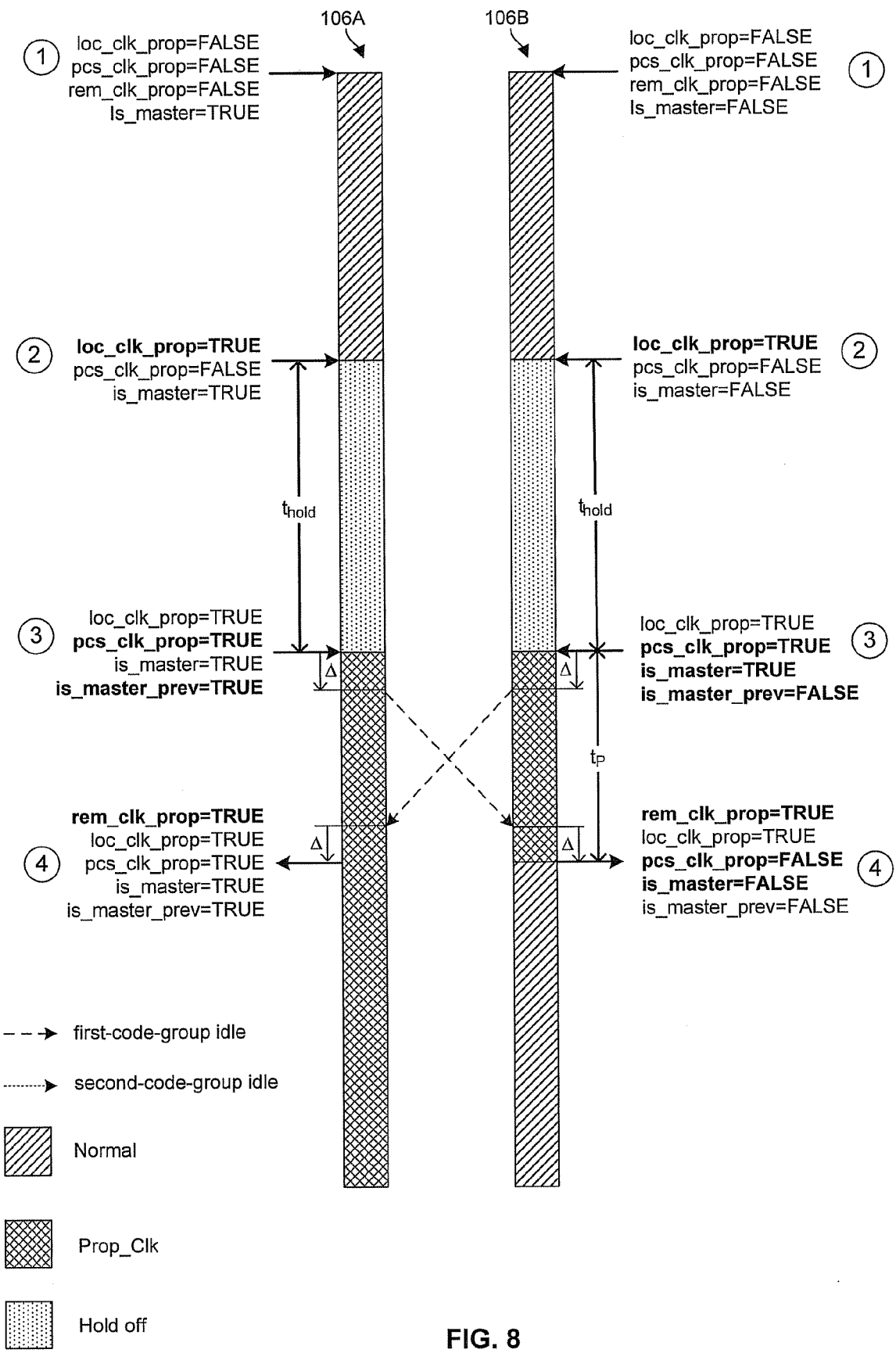
FIG. 8 is a diagram illustrating a scenario in which a conflict results from two Ethernet PHYs indicating an ability to be timing master, and the conflict is resolved with the previous timing master remaining as timing master, in accordance with an embodiment of the invention.

FIG. 8 is a diagram illustrating a scenario in which a conflict results from two Ethernet PHYs indicating an ability to be timing master, and the conflict is resolved with the previous timing master remaining as timing master, in accordance with an embodiment of the invention. Referring to FIG. 8, at time instant 1 the PHYs 106A and 106B may have just completed link up with the PHY 106A having been selected as IEEE 802.3 master. Accordingly, the register is_master in the PHY 106A may be TRUE and the register is_master in the PHY 106B may be FALSE.

At time instant 2, both timing sources 104A and 104B may assert the signal loc_clk_prop to their respective PHYs. Both of the PHYs 106A and 106B may transition to the HOLD state and the register pcs_clk_prop in each of the PHYs 106A and 1068 may remain FALSE. A conflict may arise when assertion of signal 114A is sufficiently close in time to signal 114B. A conflict does not necessarily require signals 114A and 114B being asserted simultaneously. For example, a conflict may arise when loc_clk_prop 114A is asserted and then loc_clk_prop 114B is asserted before PHY 106$_{B2}$ receives the indication that pcs_clk_prop has been asserted in the PHY 106$_{A1}$.

At time instant 3, the signal hold_time_done is asserted in each of PHYs 106A and 106B. In response, the register pcs_clk_prop is asserted in each of PHYs 106A and 106B. In response to the assertion of the register pcs_clk_prop, the register is_master is updated in each of PHYs 106A and 106B, but before the register is_master is updated, the state of the register is_master is copied to the register is_master_prev in each of the PHYs 106A and 106B. In the scenario in FIG. 8, the register is_master_prev in PHY 106A becomes (or remains) TRUE, the register is_master in PHY 106A remains TRUE, the register is_master_prev in PHY 106B becomes (or remains) FALSE, and the register is_master in PHY 106B becomes TRUE. In response to each of the registers pcs_clk_prop being asserted, each of the PHYs 106A and 106B transmit an indication that it is propagating a clock to the other PHY that is suitable for the other PHY to synchronize to. These indications are received at time instant 4.

At time instant 4, the register rem_clk_true in PHY 106A is asserted in response to receiving the indication from the PHY

106B. Similarly, the register rem_clk_true in PHY 106B is asserted in response to receiving the indication from the PHY 106A. The combination of both the register rem_clk_prop and the register is_master_prev being TRUE in PHY 106A causes the register pcs_clk_prop to remain true in PHY 106A, The combination of the register rem_clk_prop being TRUE and the register is_master_prev being FALSE in PHY 106B causes the register pcs_clk_prop in PHY 106B to be deasserted. Consequently, the register is_master in PHY 106B is deasserted. Thus, where the "race" to become master is a tie, the conflict is resolved by the previous timing master remaining as timing master.

Various aspects of a method and system for clock selection for synchronous Ethernet are provided. In an exemplary embodiment of the invention, an Ethernet PHY 106A may receive an indication, such as assertion of the signal 114A, from a local timing source 104A that a local clock is suitable for propagation by the Ethernet PHY 106A to a link partner 106B of the Ethernet PHY. In response to receiving the indication from the local timing source 104A, a timer in the Ethernet PHY 106A may be started. In instances that the Ethernet PHY 106A receives, during a time period subsequent to starting the timer and before the timer reaches a predetermined value, an indication that the link partner 106B is propagating a clock that is suitable for the Ethernet PHY 106A to synchronize to, the Ethernet PHY 106A may be configured as timing slave. In instances that the Ethernet PHY 106A does not receive, during said time period subsequent to starting the timer and before the timer reaches a predetermined value, an indication that the link partner 106B is propagating a clock that is suitable for the Ethernet PHY 106A to synchronize to, the Ethernet PHY 106A may be configured as timing master upon the timer reaching the predetermined value.

In instances that the Ethernet PHY 106A is configured as timing master, upon receiving an indication that the link partner 106B is propagating a clock for the Ethernet PHY 106A to synchronize to, the Ethernet PHY 106B may be configured based on whether the Ethernet PHY 106A was configured as timing master prior to receiving the indication from the local timing source 104A. In instances that the Ethernet PHY 106A was configured as timing master prior to receiving the indication from the local timing source 104A, the indication from the link partner 106B may be ignored and the Ethernet PHY 106A may remain configured as timing master. In instances that the Ethernet PHY 106A was configured as timing slave prior to receiving the indication from the local timing source 104A, the Ethernet PHY 106A may be reconfigured as timing slave.

The indication received from the link partner 106B may comprise a distinctively-encoded idle symbol. In instances that the Ethernet PHY 106A is configured as timing master, transmitting an indication that the Ethernet PHY 106A is propagating a clock suitable for the link partner 106B to synchronize to. Similarly, the indication transmitted by the Ethernet PHY 106A may comprise a distinctively-encoded idle symbol. A configuration of the Ethernet PHY 106A may transition from timing master to timing slave without changing a role of the Ethernet PHY 106A as either IEEE 802.3 master or IEEE 802.3 slave. Similarly, a configuration of the Ethernet PHY 106A may transition from timing slave to timing master without changing a role of the Ethernet PHY 106A as either IEEE 802.3 master or IEEE 802.3 slave. In instances that the Ethernet PHY 106A is configured as timing slave, a clock of the Ethernet PHY 106A may be synchronized to the clock propagated by the link partner. In instances that the Ethernet PHY 106A is configured as timing master, upon receiving an indication from the local timing source 104A that the local clock is no longer suitable for propagation to the link partner 106B, the Ethernet PHY 106A may transmit an indication that the Ethernet PHY 106A is no longer propagating a clock that is suitable for the link partner 106B to synchronize to.

Another embodiment of the invention may provide a non-transitory computer readable medium, having stored thereon, a computer program having at least one code section executable by a computer, thereby causing the computer to perform the steps as described herein for a clock selection for synchronous Ethernet.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   receiving, by an Ethernet PHY, a first indication from a local timing source that a local clock is suitable for propagation to a link partner of said Ethernet PHY;
   starting a timer in said Ethernet PHY in response to the receiving of said indication;
   autonegotiating, by the Ethernet PHY with the link partner, to establish an active physical Ethernet layer connection between the Ethernet PHY and the link partner;
   configuring, after the establishment of the active physical Ethernet layer connection between the Ethernet PHY and the link partner, said Ethernet PHY as a timing slave when said Ethernet PHY receives a second indication during a time period after said starting said timer and before said timer reaches a predetermined value, said second indication including encoded symbols indicating that a clock signal suitable for synchronization is propagated by said link partner;
   configuring, after the establishment of the active physical Ethernet layer connection between the Ethernet PHY and the link partner, said Ethernet PHY as a timing master when said Ethernet PHY does not receive said second indication during said time period after said starting said timer and before said timer reaches said predetermined value;

propagating, by said Ethernet PHY, said local clock signal to said link partner when said timer reaches said predetermined value and said Ethernet PHY is configured as said timing master;

maintaining, when said Ethernet PHY is configured as said timing slave, the active physical Ethernet layer connection in response to a detected change in the clock signal propagated by said link partner; and maintaining, when said Ethernet PHY is configured as said timing master, the active physical Ethernet layer connection in response to the detected change in the local clock;

transmitting, by the Ethernet PHY and when said Ethernet PHY is configured as said timing master, upon receiving a third indication from said local timing source that said local clock is no longer suitable for propagation to said link partner, a fourth indication to said link partner that said Ethernet PHY is no longer propagating said clock signal.

2. The method according to claim 1, further comprising:
determining, when said Ethernet PHY is configured as said timing master and said Ethernet PHY receives said second indication, whether said Ethernet PHY was configured as said timing master prior to reception of said second indication from said link partner; and
configuring said Ethernet PHY as said timing slave or as said timing master based on a result of said determining.

3. The method according to claim 2, further comprising ignoring said second indication received from said link partner and remaining configured as said timing master when said Ethernet PHY was configured as said timing master prior to reception of said second indication.

4. The method according to claim 2, further comprising reconfiguring said Ethernet PHY as said timing slave when reception of said second indication was prior to said Ethernet PHY being configured as said timing master.

5. The method according to claim 1, further comprising transmitting, when said Ethernet PHY is configured as said timing master, an indication that said Ethernet PHY is propagating a clock suitable for said link partner to synchronize to.

6. The method according to claim 5, wherein said indication comprises a distinctively-encoded idle symbol.

7. The method according to claim 1, wherein
said Ethernet PHY includes a first configuration for transitioning from said timing master to said timing slave without changing a role of said Ethernet PHY as 802.3 master or IEEE 802.3 slave, and
said Ethernet PHY includes a second configuration for transitioning from said timing slave to said timing master without changing a role of said Ethernet PHY as 802.3 master or IEEE 802.3 slave.

8. The method according to claim 1, further comprising synchronizing a clock of said Ethernet PHY to said clock signal propagated by said link partner when said Ethernet PHY is configured as said timing slave.

9. The method according to claim 1, wherein when the Ethernet PHY is changed to either the timing master or the timing slave, the Ethernet PHY maintains the active physical Ethernet layer connection without re-entering autonegotiation with the link partner.

10. A system comprising:
one or more circuits for use in an Ethernet PHY, said one or more circuits comprising a timer, and said one or more circuits is configured to:
receive a first indication from a local timing source that a local clock is suitable for propagation by said Ethernet PHY to a link partner of said Ethernet PHY;
start a timer in said Ethernet PHY in response to the reception of said indication;
autonegotiate with the link partner to establish an active physical Ethernet layer connection between the Ethernet PHY and the link partner;
configure, after the establishment of the active physical Ethernet layer connection between the Ethernet PHY and the link partner, said Ethernet PHY as a timing slave when said Ethernet PHY receives a second indication during a time period after said starting said timer and before said timer reaches a predetermined value, said second indication including encoded symbols indicating that a clock signal suitable for synchronization is propagated by said link partner;
configure, after the establishment of the active physical Ethernet layer connection between the Ethernet PHY and the link partner, said Ethernet PHY as a timing master when said Ethernet PHY does not receive said second indication during said time period after said starting said timer and before said timer reaches a predetermined value;
propagate said local clock signal to said link partner when said timer reaches said predetermined value and said Ethernet PHY is configured as said timing master;
maintain, when said Ethernet PHY is configured as said timing slave, the active physical Ethernet layer connection in response to a detected change in the clock signal propagated by said link partner; and
maintain, when said Ethernet PHY is configured as said timing master, the active physical Ethernet layer connection in response to the detected change in the local clock;
wherein said one or more circuits are further configured to transmit, when said Ethernet PHY is configured as said timing master, upon receiving a third indication from said local timing source that said local clock is no longer suitable for propagation to said link partner, a fourth indication to said link partner that said Ethernet PHY is no longer propagating said clock signal.

11. The system according to claim 10, wherein said one or more circuits are further configured to:
determine, when said Ethernet PHY is configured as said timing master and said Ethernet PHY receives said second indication, whether said Ethernet PHY was configured as said timing master prior to reception of said second indication from said link partner; and
configure said Ethernet PHY as said timing slave or as said timing master based on a result of said determination.

12. The system according to claim 11, wherein said one or more circuits are further configured to ignore said second indication received from said link partner and remain configured as said timing master when said Ethernet PHY was configured as said timing master prior to reception of said second indication.

13. The system according to claim 11, wherein said one or more circuits are further configured to reconfigure said Ethernet PHY as said timing slave when reception of said second indication was prior to said Ethernet PHY being configured as said timing master.

14. The system according to claim 10, wherein said one or more circuits are further configured to transmit, when said Ethernet PHY is configured as said timing master, an indication that said Ethernet PHY is propagating a clock suitable for said link partner to synchronize to.

15. The system according to claim 14, wherein said indication comprises a distinctively-encoded idle symbol.

16. The system according to claim 10, wherein
said Ethernet PHY includes a first configuration for transitioning from said timing master to said timing slave without changing a role of said Ethernet PHY as 802.3 master or IEEE 802.3 slave, and
said Ethernet PHY includes a second configuration for transitioning from said timing slave to said timing master without changing a role of said Ethernet PHY as 802.3 master or IEEE 802.3 slave.

17. The system according to claim 10, wherein said one or more circuits are further configured to synchronize a clock of said Ethernet PHY to said clock signal propagated by said link partner when said Ethernet PHY is configured as said timing slave.

18. The system according to claim 10, wherein when the Ethernet PHY is changed to either the timing master or the timing slave, the one or more circuits maintain the active physical Ethernet layer connection without re-entering auto-negotiation with the link partner.

* * * * *